March 17, 1953  W. B. BLANTON ET AL  2,632,043
TELEGRAPH EXCHANGE SYSTEM
Filed Jan. 2, 1948  9 Sheets-Sheet 1

INVENTORS
W. B. BLANTON
F. L. CURRIE
G. W. JANSON
BY
M. R. Marsh
ATTORNEY

March 17, 1953 W. B. BLANTON ET AL 2,632,043
TELEGRAPH EXCHANGE SYSTEM
Filed Jan. 2, 1948 9 Sheets-Sheet 5

FIG. 5

INVENTORS
W. B. BLANTON
F. L. CURRIE
G. W. JANSON
ATTORNEY

March 17, 1953  W. B. BLANTON ET AL  2,632,043
TELEGRAPH EXCHANGE SYSTEM
Filed Jan. 2, 1948  9 Sheets-Sheet 7

FIG. 7

INVENTORS
W. B. BLANTON
F. L. CURRIE
G. W. JANSON
BY M. R. Marsh
ATTORNEY

Patented Mar. 17, 1953

2,632,043

UNITED STATES PATENT OFFICE 2,632,043

TELEGRAPH EXCHANGE SYSTEM

William B. Blanton, Rockville Centre, N. Y., and Frank L. Currie, Plainfield, and George W. Janson, Nutley, N. J., assignors to The Western Union Telegraph Company, New York, N. Y., a corporation of New York Application January 2, 1948, Serial No. 240

30 Claims. (Cl. 178—2)

This invention relates to telegraph exchange or switching systems and more particularly to so-called reperforator switching or exchange systems wherein messages are stored, for example, by being reperforated in storage tapes, incident to the relaying thereof through one or more exchange or switching centers.

A number of reperforator switching systems have been proposed heretofore, such as the systems disclosed in the patent to Blanton 2,279,295, granted April 14, 1942, and the patent to Wheeler et al., 2,193,810, granted March 19, 1940, wherein messages received at a switching center are stored in printed and perforated tapes. The tapes control respective tape transmitters which have associated therewith multiple conductor plugs whereby the transmitters may be connected through jacks to selected outgoing circuits or channels and the stored messages transmitted thereto.

In accordance with the present invention, push button controlled switching equipment instead of plugs and jacks are employed to selectively connect or extend a transmission circuit from a transmitter associated with a storage device on an incoming line circuit to desired outgoing line circuits. An obvious advantage of the push button arrangement is that at the end of the transmission of a message no further manual operation is required by the attendant as is the case in the plug and jack type of system where the operator has to remove the plug from the jack at the end of a message.

An object of the invention resides in the provision of control means whereby a single set of destination indicating push buttons is operable to direct a message from any one of a group of transmitters to the desired sending circuit or sending position.

Another object of the invention resides in the provision of means for preventing interference by a second transmitter when the common push button controlled equipment is establishing a connection for another transmitter.

In this connection another object of the invention resides in the provision of means to release the common push button controlled equipment associated with a group of transmitters as soon as the desired connection has been established between a transmitter and a selected sending position to permit use of the common equipment to establish other connections.

Still another object of the invention resides in the provision of visual signaling means to inform the operator of the progress of the common push button controlled equipment in establishing a connection between a transmitter and a sending circuit.

The above and further features and objects of the invention will be more apparent in the following detailed description wherein reference is made to the accompanying drawings, in the latter of which.

General description

The principles of the present invention are shown and described as applied to an exchange system of the type sometimes called a double storage system or one wherein the signals are stored twice incident to the relaying thereof through a switching center or office. The first storage of the signal occurs at an instrument such as a printer perforator responding to signals received over an incoming line to perforate and print on a tape the received signals. This perforated tape controls a first transmitter which transmits the signals across or intra-office to a selected sending position where the signals control a perforator to prepare a second perforated tape associated with a second transmitter adapted to transmit to the selected outgoing line or channel.

The first storage of a message in a perforated tape and the printing of the message characters alongside the perforations enables an attendant to direct the message across the office to the proper sending position associated with the desired outgoing line. In the present system this directing of a message through the office is accomplished by an attendant through the operation of push buttons.

In the embodiment of the invention described herein the receiving positions or the receiving printer perforators are arranged in groups, and each such group has an individually associated connector circuit which includes a single set of destination indicating push buttons, one for each sending circuit to which a message may be directed. The number of receiving positions in a group is determined by message traffic conditions and in the drawings and in the following description three receiving positions or receiving printer perforators together with their associated intra-office transmitter circuits are shown and described as being associated with one connector circuit.

When a message or a part of a message is received at a switching center and perforated in the storage tape of the receiving printer perforator, a control circuit permits the transmitter to advance the message separating perforations in the tape therethrough to bring the first character of the message over the transmitter sensing pins, whereupon further advancement ceases. The accumulation of perforated tape ahead of the transmitter informs the operator that a message or at least a part thereof is stored in the perforated tape. Thereupon the operator may, as would be the case in some instances, without waiting for the entire message to be received, proceed to direct the message to the proper sending circuit or position as indicated by the address portion of the message which usually appears on the first part thereof. This directing of the message through the switching office by the operator is accomplished by first operating a so-called transmitter activate or initiate push button or key, one of which is individually associated with each transmitter, and thereafter operating a destination push button corresponding to the destination to which the message is intended. The operation of the transmitter initiate key seizes the connector circuit and prevents another connection therethrough until a connection from the first transmitter to the desired sending circuit has been completed. The operation of the destination push button initiates operation of the connector circuit to establish the connection from the first intra-office transmitter circuit to the desired sending circuit. Various lights in each intra-office transmitter circuit are operated to inform the operator as to the progress being made by the connector circuit in establishing the desired circuit, and as soon as one connection is established from one intra-office transmitter circuit to a sending circuit, the connector circuit is available for the establishment of another circuit from any of the other intra-office transmitter circuits to desired sending circuits.

If an attempt is made to establish a connection from an intra-office transmitter circuit to a sending circuit receiving signals from another or active intra-office transmitter circuit, the connector circuit is conditioned to automatically establish the desired connection on the completion of transmission of the message from the active intra-office circuit.

*Details of intra-office transmitter and connector circuits*

An intra-office transmitter circuit consists primarily of a transmitter and control circuits for relaying messages appearing in a tape prepared by an associated printer perforator, to a reperforator at, or included in, a sending circuit adapted to transmit to a sending line. An intra-office transmitter circuit also includes means for exclusively seizing an intra-office transmission path and automatically releasing the same to permit it to be seized by a second intra-office circuit at the end of a message from a first intra-office transmitter circuit.

The connector circuit consists primarily of a series of destination indicating push buttons, one for each destination to which a message may be transmitted, and associated control circuits for controlling the operation of rotary switches whereby circuits or transmission paths are extended from an intra-office transmitter circuit to a sending circuit. In the embodiment of the invention described and shown herein, provision is made for connecting an intra-office transmitter circuit to any one of fifty sending circuits at a time and these connections are established through either one or the other of a pair of multi-level 25 point rotary switches. Obviously, the system disclosed herein may be enlarged to permit establishing connections to a greater number of sending circuits.

As above pointed out, intra-office transmitter circuits are arranged in groups and the drawings show the manner in which a group of three such circuits may be associated with a single connector circuit. In the connector circuit which provides the means for extending a transmission path from any one of the intra-office transmitter circuits to any one of fifty sending circuits, a common bank or turret of destination indicating push buttons is provided. With the various drawings arranged as indicated on Fig. 10, the intra-office transmitter circuit of Figs. 1 and 2 is connected to Fig. 5 or the first section of the connector circuit, and other intra-office transmitter circuits, such as the second and third of Fig. 3, would be connected to Figs. 6 and 7, or the second and third sections, respectively, of the connector circuit.

Figures 1, 10:
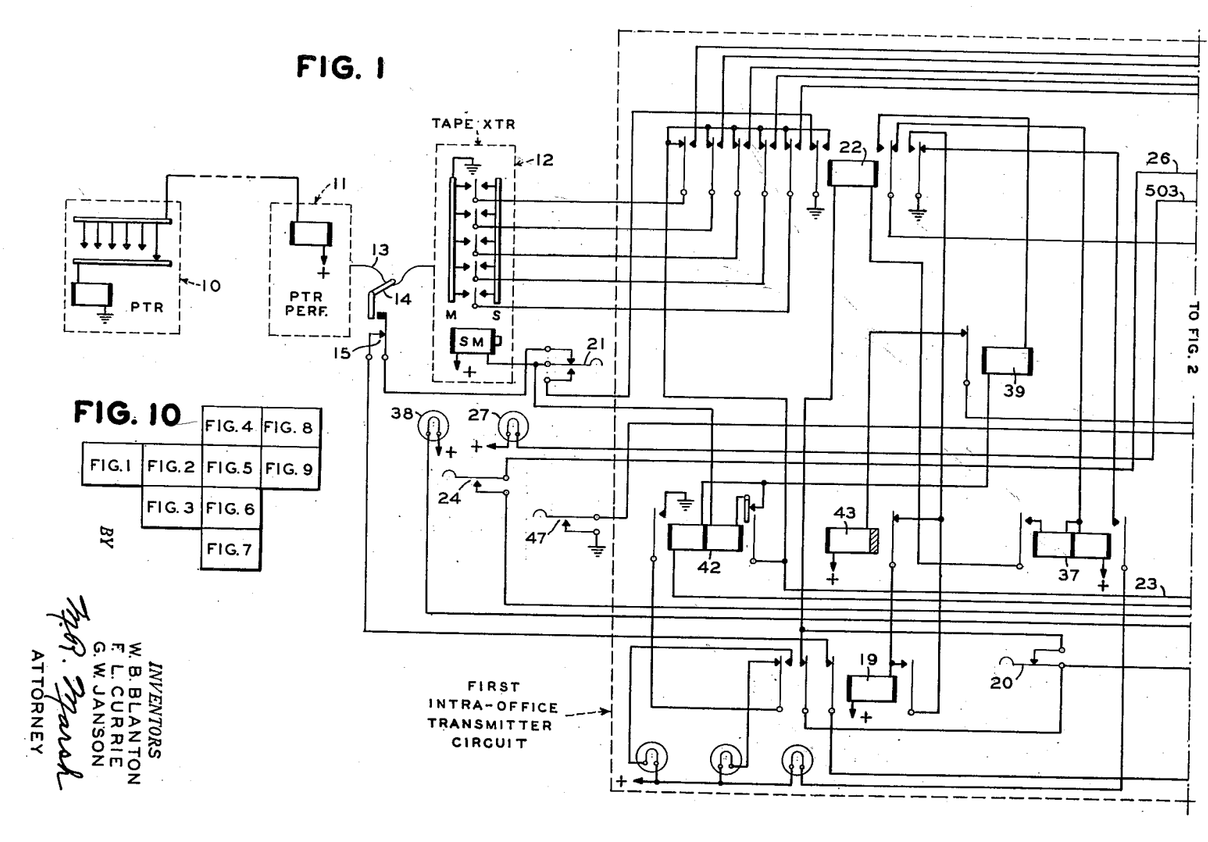
Figs. 1 and 2 illustrate a remote or branch office connected to the switching center by a line and terminating in a printer perforator for preparing a tape to control a tape transmitter, together with the circuit details of the associated so-called intra-office transmitter circuit.
Fig. 10 shows the manner in which Figs. 1 to 9 may be arranged together to form a part of a complete exchange system.
Figure 2:
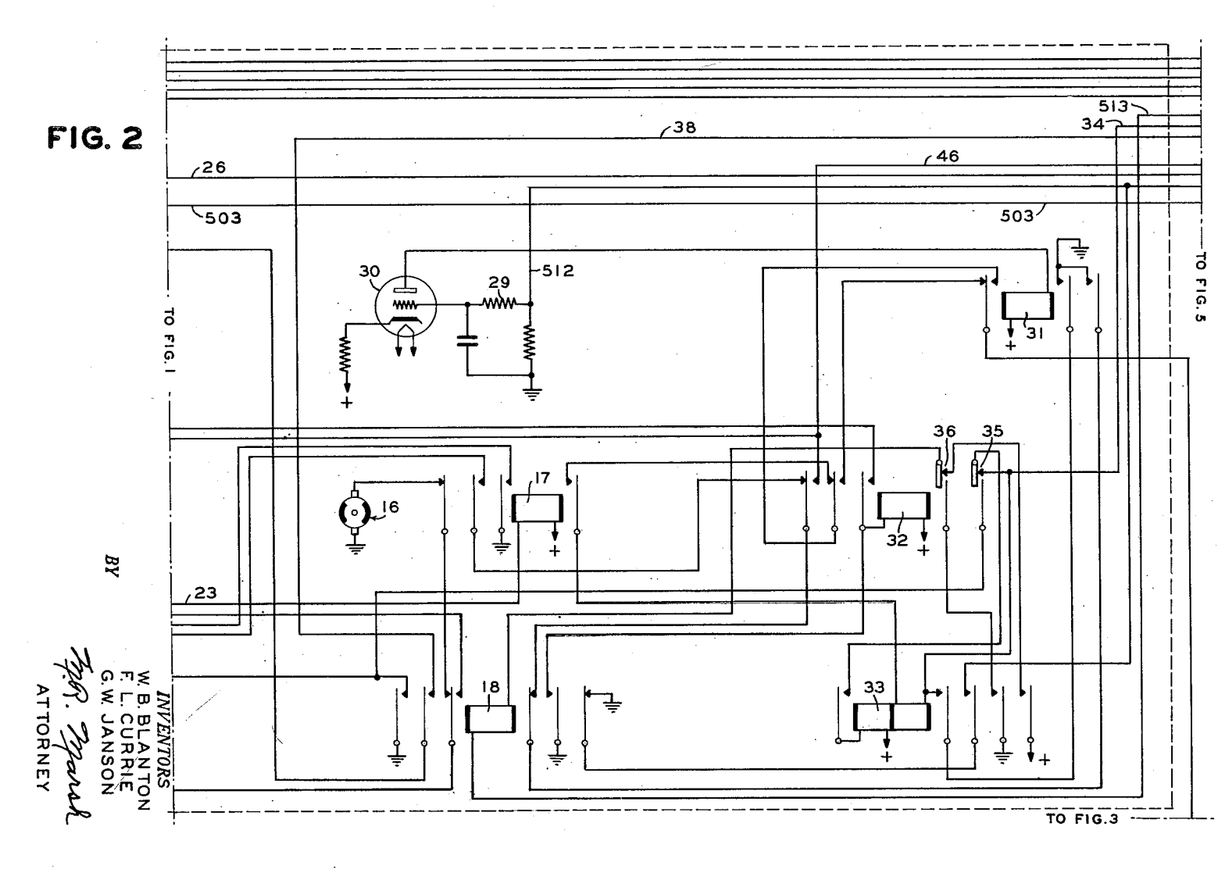
Figure 3:
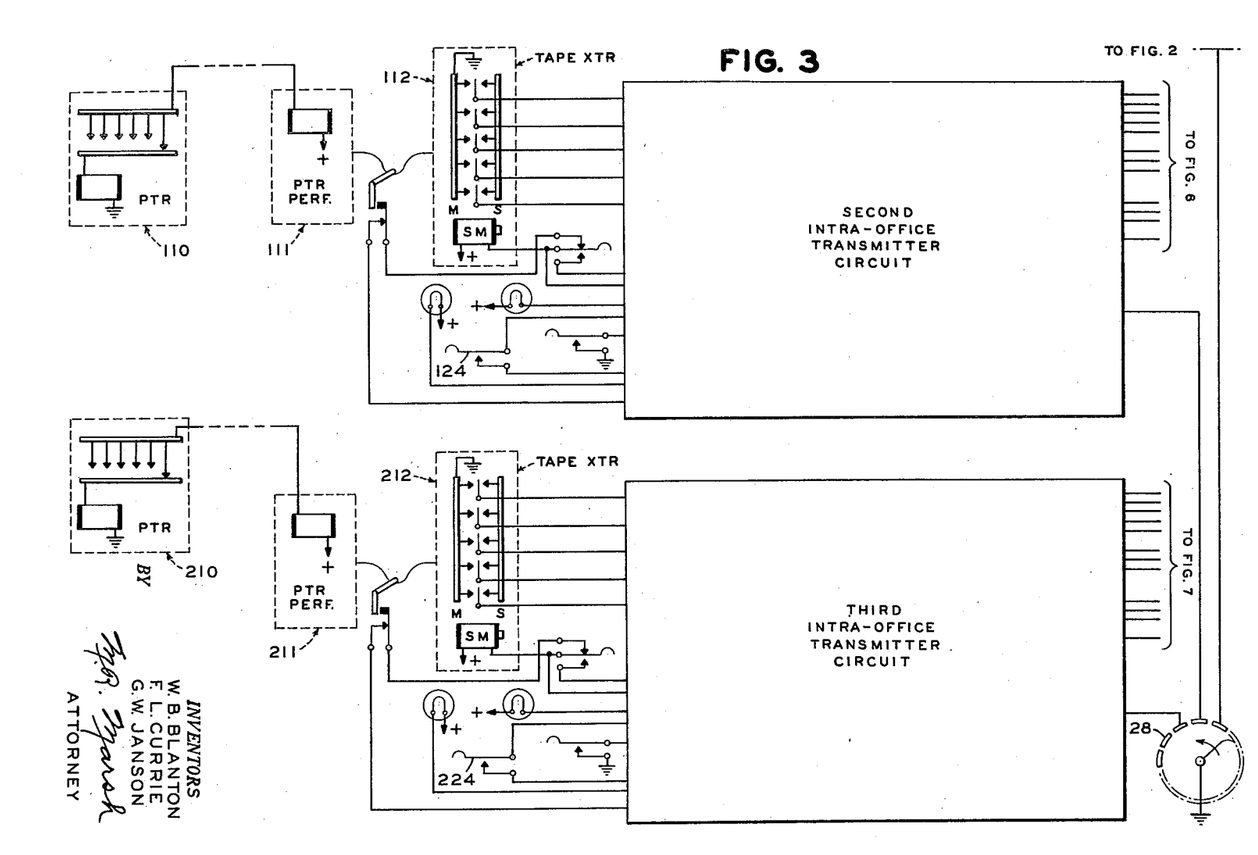
Fig. 3 illustrates a second and third remote office connected to the switching office, together with associated transmitters and sections of their respective intra-office transmitter circuits.
Figure 4:
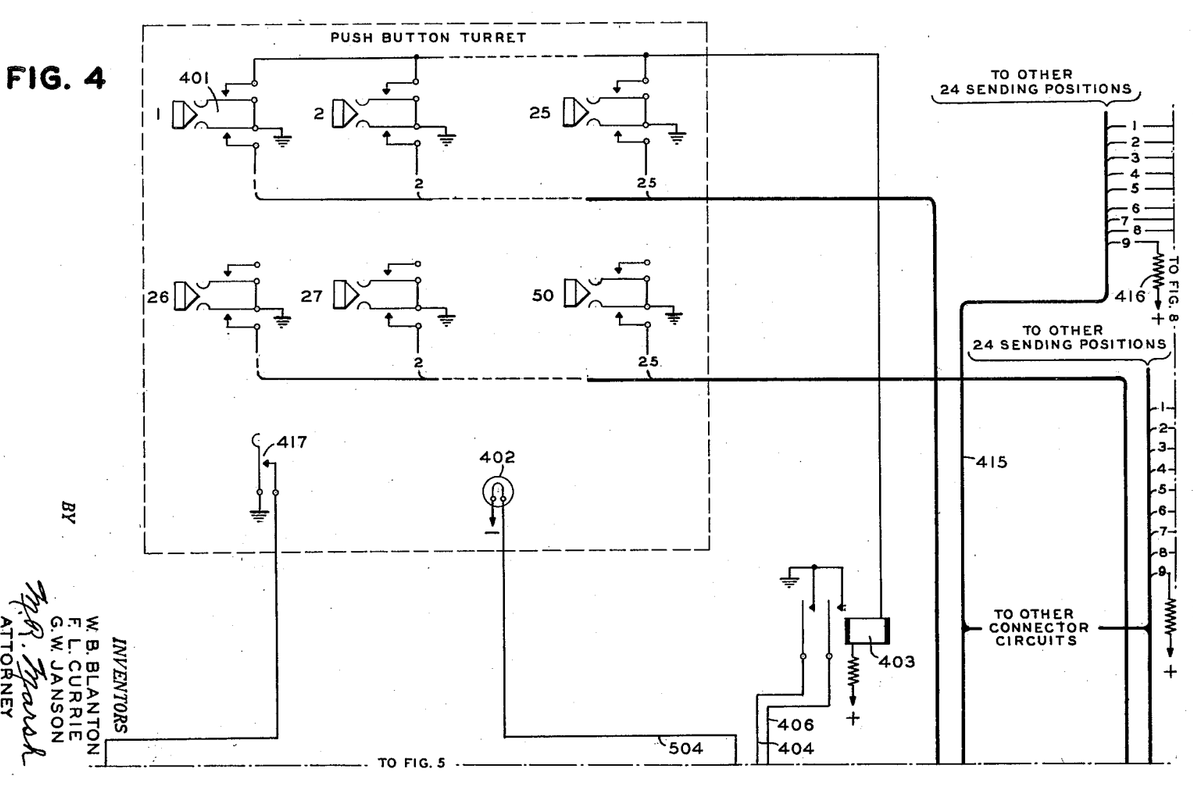
Figs. 4, 5, 6 and 7 illustrate the circuit details of a so-called push-button turret and the associated controlled equipment, both of which are hereinafter referred to as a connector circuit, and which function to connect the intra-office transmitter circuits, such as those shown in Figs. 1 to 3, with desired sending circuits.

The printer perforator 11 of the first intra-office transmitter circuit of Figs. 1 and 2 as well as printer perforators 111 and 211 of the second and third intra-office transmitter circuits, Fig. 3, may be of the general type disclosed in Patent No. 2,174,731 to Dirkes et al., granted October 3, 1939. These instruments respond to signals received over connecting lines from associated remote branch offices or stations 10, 110 and 210, respectively, and their associated tape transmitters 12, 112 and 212 may be of the type disclosed in Patent No. 2,172,269, to Angel et al., issued September 5, 1939.

The printer perforators, such as 11, may also be provided with an automatic tape feed-out device which at the end of a message is effective to feed out message separating characters or blanks to enable the last message character perforated therein to reach the sensing pins of the transmitter. Accordingly, with no messages stored in the storage tape 13 extending between a printer perforator and its transmitter, the tape will have only blanks perforated therein, which, as well understood in the art, consist of all spacing combinations. Let it be assumed that this is the condition of the tape 13 between the printer perforator 11 and the tape transmitter 12 of the intra-office transmitter circuit shown in Figs. 1 and 2, and that subsequently the printer perforator begins to store a message in the tape. The increase in the size of the tape loop will permit the tape lever 14 to close its associated contacts 15 whereby a circuit is established to the step magnet SM of the tape transmitter. This circuit extends from an interrupter device or impulse unit 16, Fig. 2, back contacts and tongues of relays 17, 18 and 19, tape lever contacts 15, upper contacts of a key 21, and through the coil of the step magnet SM to potential. Accordingly, each time the impulse unit 16 applies ground to the above circuit, the step magnet is energized to advance the tape 13 one step, and this continues until the first character of the message appears over the pins of the tape transmitter 12 at which time the above circuit is interrupted by the operation of relay 17. The circuit for operating relay 17 extends from ground at the marking bus bar M of the tape transmitter 12, through one or more of the tongues thereof, which will contact their marking stops when the transmitter is sensing a character having one or more marking impulses, one or more of the five outer left hand tongues and back contacts of relay 22, conductor 23 and the coil of relay 17 to potential.

The operation of relay 17 through its outer left hand tongue opens the above-described circuit to the step magnet SM of the tape transmitter 12 and accordingly the first message character perforated in the tape will remain associated with the sensing pins of the transmitter. Through its inner left hand tongue and front contact, relay 17 applies a ground to one terminal of the transmitter initiate key 24 of the tape transmitter 12, whereupon the operator, either before or after the complete message is stored in the tape, may operate the transmitter initiate key 24 to condition the associated intra-office transmitter circuit for operation and to seize the connector circuit if it is idle.

Figure 5:
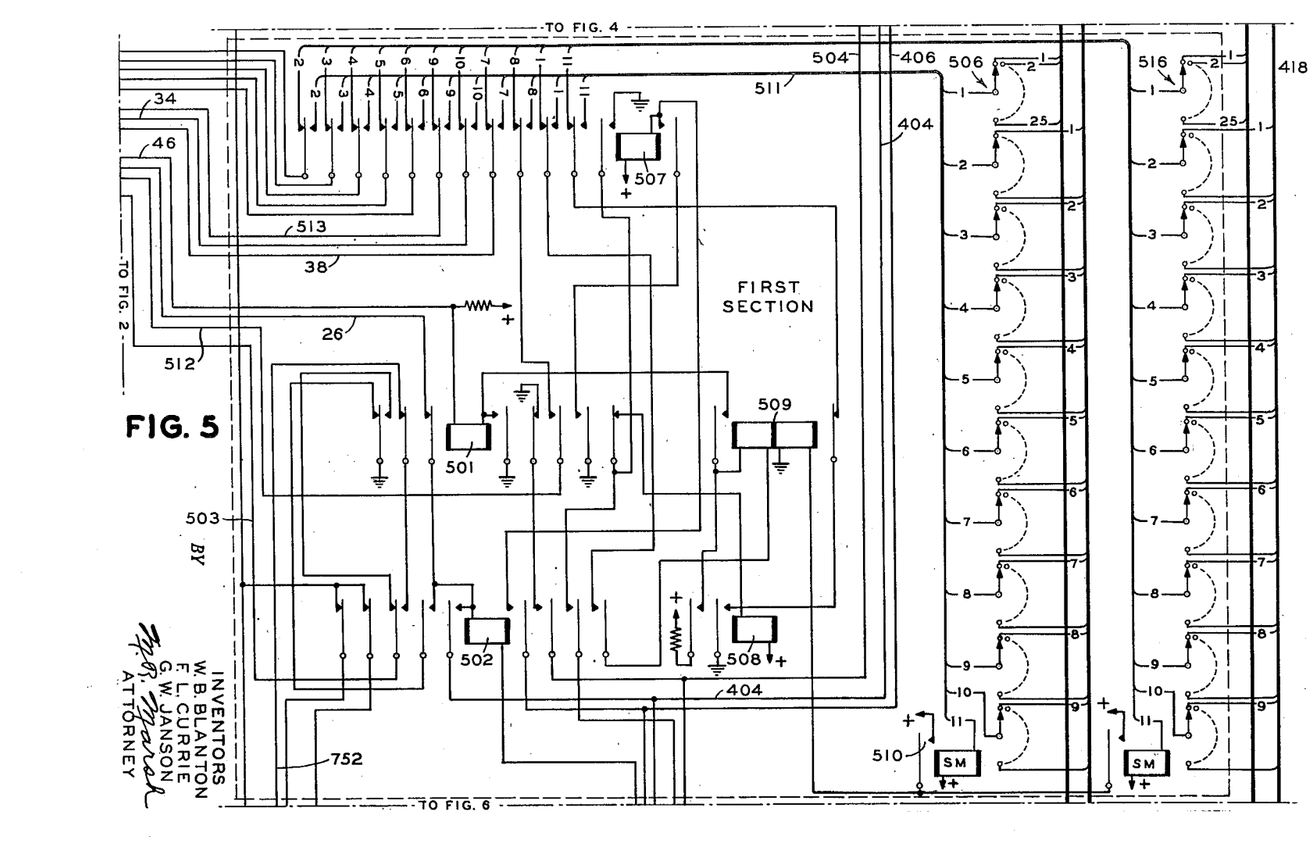

Assuming the connector circuit to be idle, operation of the transmitter initiate key 24 continues the above-described circuit over conductor 26 to the first section, Fig. 5, of the connector circuit, where the circuit is continued through the back contact and inner left hand tongue of relay 501, the coil of relay 502, and back contacts and tongues of relays 602 and 702 to potential. Thus if relays 602 and 702 are unoperated, which is their assumed condition, the operation of the transmitter initiate key 24 will effect operation of relay 502 which locks up to ground through its second left hand tongue and front contact and the back contact and outer tongue of relay 501.

In a similar manner operation of transmitter initiate key 124 of the second intra-office transmitter circuit completes a circuit extending through the coil of relay 602 and back contacts of relays 702 and 502 to potential, to effect energization of relay 602, and operation of transmitter initiate key 224 of the third intra-office transmitter circuit completes a circuit through the coil of relay 702 and back contacts of relays 602 and 502 to potential. Since the circuits to relays 502, 602 and 702 extend through back contacts of the others, only one of the relays 502, 602 or 702 can be operated at a time and hence only one of the intra-office transmitter circuits can seize its associated part of the connector circuit at a time. However, in a manner to be described, an operated relay such as 502, 602 or 702 is released as soon as a desired connection is established from an intra-office transmitter circuit to a sending circuit and the connector circuit is thereafter available for seizure by any of the other intra-office circuits of that particular group.

As relay 502 operates on the actuation of the transmitter initiate key 24, a circuit is completed from ground through a circuit interrupter 751, conductor 752, the back contact and second left hand tongue of relay 501, the front contact and third left hand tongue of relay 502, conductor 503, and through a so-called transmitter switching lamp 27 to potential. The lamp 27 will thereupon flash and inform the operator that the associated connector circuit has been seized and the desired destination push button such as 401 can now be operated. Simultaneously the operation of relay 502 completes a circuit from ground through the back contact and second right hand tongue of relay 501, the front contact and second right hand tongue of relay 502, conductor 504 and the so-called turret switching lamp 402 associated with the destination push buttons to potential. This lamp glows steadily since the circuit thereto is maintained in a closed condition for the time being and informs other attendants who may be switching messages through the connector circuit that it has been seized.

As pointed out, the connector circuit of Figs. 4 to 7 is capable of connecting an associated intra-office transmitter circuit to any one of fifty outgoing or sending circuits, and the connections are established by means of a pair of multi-level rotary switches. One group of push buttons, for example, the first twenty-five, control the establishment of an intra-office transmitter connection through one of the rotary switches, and the second group of push buttons, such as those indicated 26 to 50 control the establishment of a connection through the second rotary switch.

It will be assumed that the destination to which the message in the tape 13 is intended is represented by the first or No. 1 push button 401 of the connector circuit and that after operating the transmitter initiate key 24 and observing that lamp 27 begins to flash, the operator next operates the destination push button 401. The transmitter intiate key 24 may be released immediately after operating but the destination push button 401 should be held depressed until the desired connection has been established. The operator is informed that the desired connection has been established by the turret switching lamp 402 ceasing to glow.

The operation of a destination push button 401, such as the first or No. 1 button of the first group, through its upper contacts establishes a circuit from ground through the coil of relay 403 to potential whereby relay 403 is operated. As the lower pair of contacts of such a push button close, a ground is applied to the corresponding or first point on the upper or No. 1 level of the rotary switch 506 to thereby mark this point. Similarly, the operation of any one of the other push buttons Nos. 2 to 25 will mark corresponding points on the upper level of rotary switch 506, and effect operation of relay 403.

Relay 403 on operating applies ground through its front contact and outer tongue, conductor 404, the inner left hand tongue and front contact of relay 502 to the coil thereof to lock the same operated when the previously described locking circuit is interrupted. Through its inner tongue, operation of relay 403 applies ground over conductor 406 and through the inner right hand tongue and front contact of relay 502 to the coil of relay 507, the other terminal of which is connected to potential. Relay 507 thereupon operates and through its eight outer left hand tongues and front contacts connects the upper eight conductors extending into Fig. 5 of the connector circuit from the first intra-office transmitter circuit, to the wipers of the second, third, fourth, fifth, sixth, ninth, tenth and seventh, respectively, from the top of rotary switch 506. Operation of relay 507 also transfers various other control circuits, which will be described, to other wipers of the rotary switch 506. Through its inner left hand tongue and front contact, relay 507 in operating establishes a circuit from ground through the outer right hand tongue and back contact of relay 501 and the coil of a relay 508 to potential, whereupon relay 508 is operated. Relay 508 in operating, through its inner tongue applies ground to a circuit extending through the right hand tongue and back contact of relay 509, the second left hand tongue and front contact of relay 507, conductor 11 of cable 511 and the coil of the step magnet SM of rotary switch 506 to potential. The step magnet SM is thereby energized and effects closing of associated contacts 510 to complete an obvious circuit through the right hand coil of relay 509 to ground. Relay 509 thereupon operates and opens the circuit through its right hand tongue to the coil of the step magnet SM of switch 506. The step magnet then releases and advances the wipers of switch 506 one step and opens contacts 510 to interrupt the circuit through the right hand coil of relay 509. Relay 509 thereupon releases and again completes the circuit through the coil of the step magnet SM, and such operation of the step magnet continues until the first wiper of the rotary switch 506 reaches its marked or grounded point.

When the wipers of rotary switch 506 reach points corresponding to the marked point of the upper level, which for the assumed condition is the first point, the ground at this point on the upper level is extended through conductor No. 1 of cable 511, the front contact and third tongue of relay 507, the front contact and outer right hand tongue of relay 502, the left hand coil of relay 509 and the front contact and outer tongue of relay 508 to potential. This circuit holds relay 509 operated and the above grounded circuit is extended through the left hand tongue and front contact of relay 509 and coil of relay 501 to potential. With relay 509 held operated, the circuit to the step magnet SM of rotary switch 506 can not be completed again and therefore the wipers remain on the point corresponding to the marked or grounded point of the upper level.

The completion of the above-described circuit through the coil of relay 501 effects operation of the same and it locks up to ground through its inner right hand tongue and front contact. As relay 501 operates, the inner or first left hand tongue thereof opens the described operating circuit to relay 502 to prevent inadvertent operation of this relay should the transmitter initiate key 24 be operated during the transmission of a message from the intra-office transmitter circuit. However, relay 502 does not immediately release since at this time it is held operated by other circuits. Operation of relay 501 through its second left hand tongue opens the above-described circuit to the transmitter switching lamp 27 so that the said lamp ceases to flash. Through its outer left hand tongue, relay 501 removes the ground from one of the locking circuits to relay 502 and applies this ground to the back contact of the third left hand tongue of relay 502 so that when relay 502 subsequently releases, a circuit is completed to the transmitter switching lamp 27 to cause it to glow steadily during the transmission of the message from the intra-office transmitter circuit.

Through its second right hand tongue, relay 501 in operating removes ground from the circuit described above to the turret switching lamp 402 whereupon said lamp goes out and thereby informs the attendant that the desired connecting function has been completed and that she may thereupon release the depressed destination push button. The third right hand tongue of relay 501 completes a so-called "start" circuit through the associated section of the connector circuit and the fourth right hand tongue of relay 501 completes a locking circuit for relay 507. Through its outer right hand tongue, relay 501 in operating opens the circuit to relay 508 whereupon the said relay releases and through its inner tongue removes the ground from the circuit to the step magnet SM of the rotary switch 506. Through its outer tongue the release of relay 508 removes battery from the left hand coil of relay 509 whereupon said relay releases if it had not already released due to the short-circuiting of this battery by the application of ground to the battery side of the coil from the inner right hand tongue of relay 501. Thus, as relay 501 operates, relay 507 has a locking circuit completed thereto and relays 508 and 509 release.

When the attendant sees the turret switching lamp 402 go out and releases the actuated destination push button such as 401, the circuit to relay 403 is interrupted whereupon said relay will release. The release of relay 403 opens the remaining locking circuit to the coil of relay 502 whereupon the said relay will release. As relay 502 releases, ground from the outer left hand tongue and front contact of relay 501 is applied to the conductor 503 to cause the transmitter switching lamp 27 to glow steadily. This indicates to the attendant that the desired connection has been made and transmission from the associated intra-office circuit will shortly commence.

In accordance with the above, relays 501 and 507 of the first section of the connector circuit or the one associated with the intra-office transmitter circuit of Figs. 1 and 2 will be in an operated condition and they will remain in this condition until the end of transmission of the message stored in the tape 13. At this time the first intelligence impulse of the message is over the pins of the associated transmitter 12.

Figure 8:
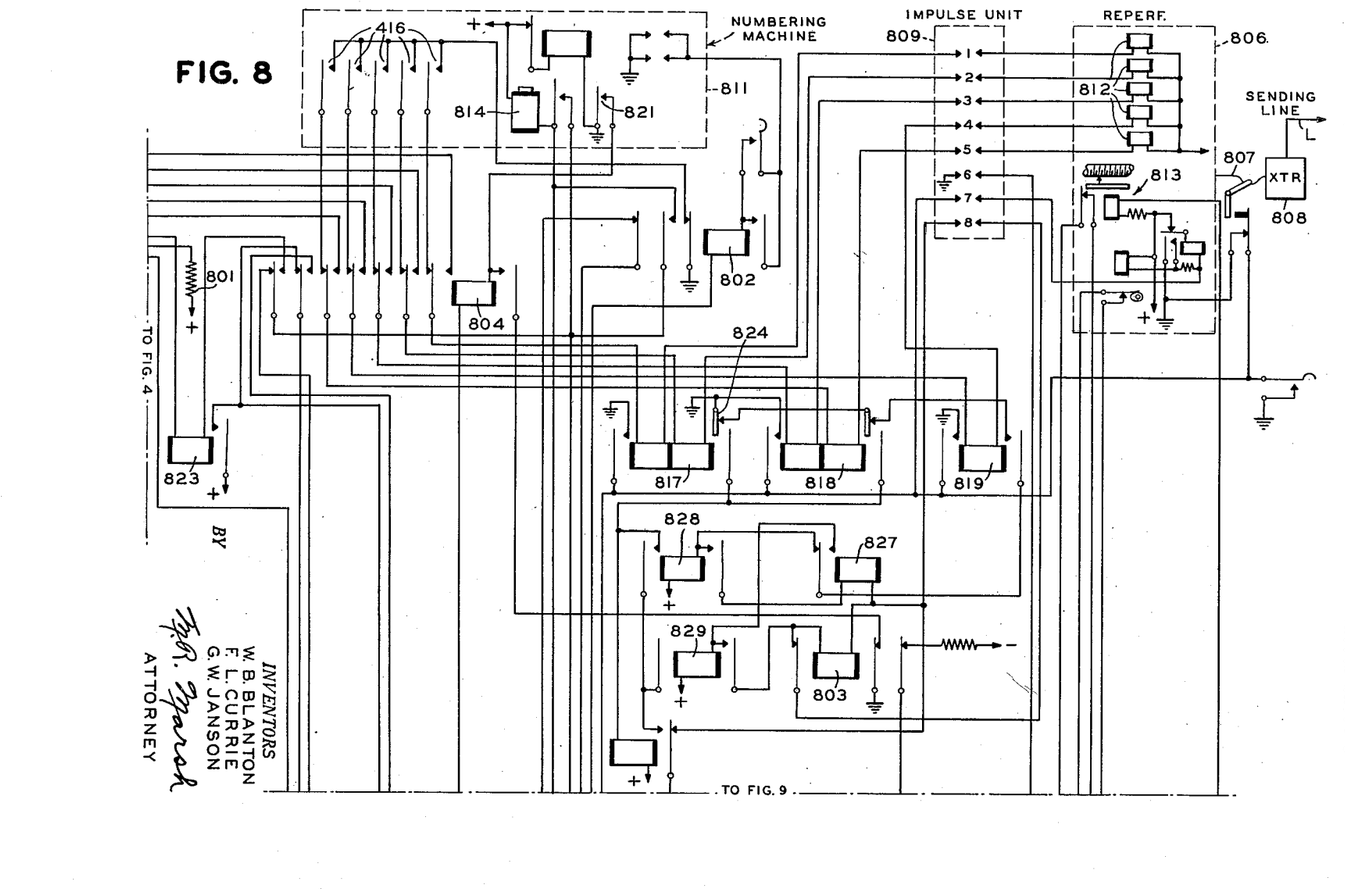
Figs. 8 and 9 are details of a so-called sending circuit and includes the details of such a circuit and some of the controls and other elements employed in the transmission of a message from the switching center to a desired sending channel or line.
Figure 9:
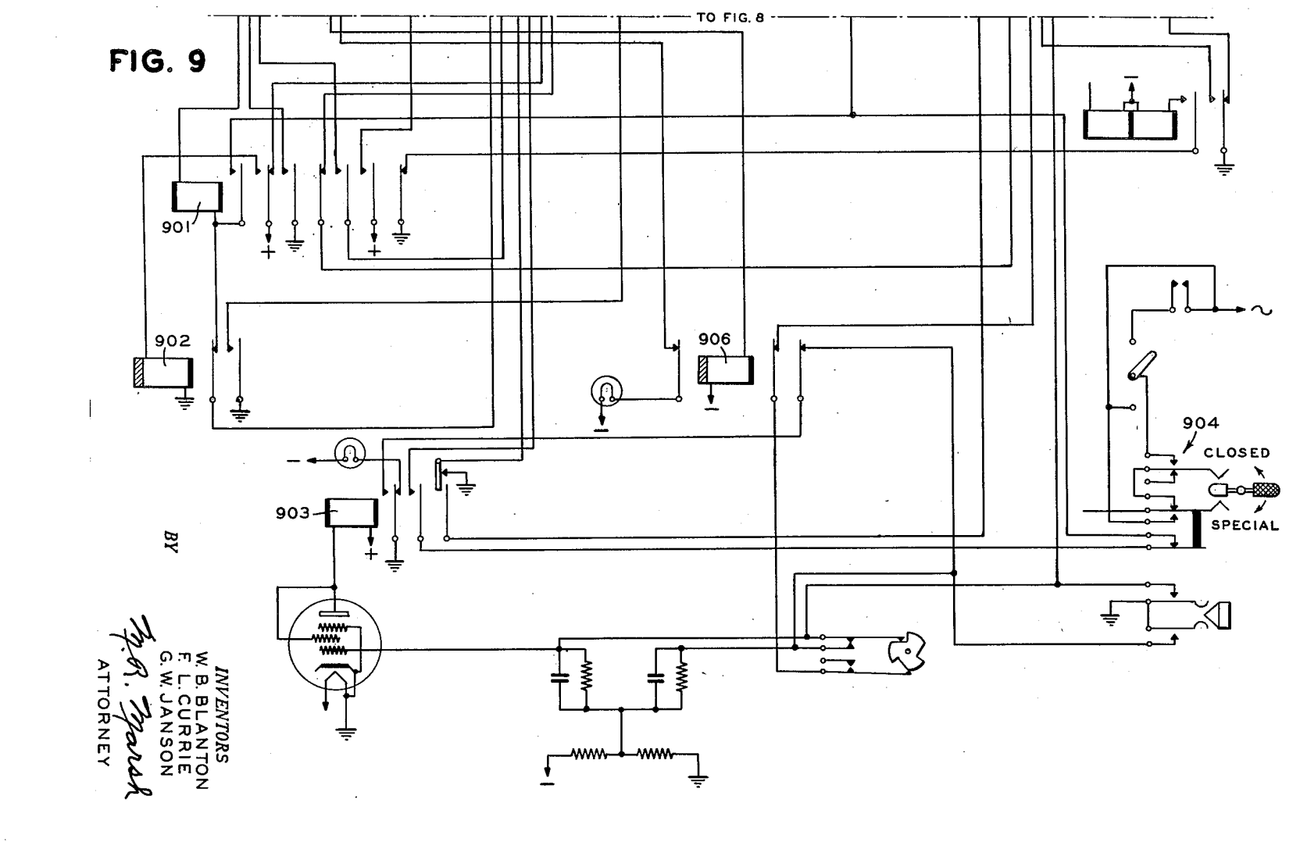

The above-mentioned "start" circuit completed on the operation of relay 501 originates at potential at the sending circuit, Figs. 8 and 9, associated with the first points of switch 506, and extends through a resistance 601, the seventh conductor of cable 415, the first point and wiper of the eighth level from the top of rotary switch 506, the eighth conductor of cable 511, a front contact and tongue of relay 507, the front contact and third right hand tongue of relay 501 to conductor 512 leading to the intra-office circuit of Figs. 1 and 2 where the circuit continues through a resistance 29 to the grid of a vacuum tube 30. Shortly after the application of potential to the grid of the vacuum tube, it passes current and effects operation of relay 31 in the plate circuit thereof. Relay 31 in operating extends a circuit from ground at the allotter 28 through its left hand tongue and front contact, the second left hand tongue and back contact of a relay 32, the front contact and right hand tongue of relay 17, the right hand coil of relay 33 to conductor 34 extending to the connector circuit, Fig. 5, where the said circuit is continued through a tongue and front contact of relay 507, the wiper and first point of the lower level of switch 506, the ninth conductor of cable 415 and through a resistance 416 to potential. Accordingly, when the allotter grounds the above circuit, relay 33 will operate. Relay 33 locks up by a circuit through its left hand coil, contacts 35 of relay 32, front contact and inner right hand tongue of relay 33, and the inner tongue and front contact of relay 31 to ground. This ground prevents other intra-office transmitter circuits from seizing the selected sending circuit of Figs. 8 and 9 should an attempt be made to connect other intra-office transmitter circuits thereto before it is released by the intra-office transmitter circuit of Figs. 1 and 2. However, if an attempt is made to connect another intra-office transmitter circuit to a seized sending circuit, the call will be registered in that particular intra-office transmitter circuit and completion of this connection will be made as soon as the connected intra-office transmitter circuit releases the same.

As relay 33 operates, it completes a so-called "private" circuit from positive potential at its outer right hand tongue, through continuity contacts 36 of relay 32, the coil of relay 18, conductor 513, a tongue and front contact of relay 507, the ninth wiper of rotary switch 506, the eighth conductor of cable 415 extending to the sending circuit, Figs. 8 and 9, where the circuit continues through the coil of relay 901, the back contact and inner right hand tongue of relay 902, the back contact and outer left hand tongue of relay 802, the front contact and second tongue of a normally operated relay 903, the lower contacts of a close-out key 904, and the outer right hand tongue and back contact of relay 803 to negative potential. This circuit effects operation of relays 18 and 901, and relay 901 in operating through its inner right hand tongue and front contacts shunts that part of the above described circuit extending through contacts of relays 902, 802, 903 and contacts of key 904. Other functions performed at the sending circuit by the operation of relay 901 will be described hereinafter and for the time being the description will be confined primarily to that of Figs. 1 and 2.

As relay 18 operates, its second right hand tongue completes a circuit for the operation of relay 32 and its inner right hand tongue opens the circuit from ground at the front contact and outer right hand tongue of relay 31 extending through contacts of relays 18, 32 and 17 to the standby lamp 38 associated with the tape transmitter 12. This lamp, the circuit to which was completed on the operation of relay 31, therefore ceases to flow and informs the operator that the desired sending circuit has been seized. Through its outer right hand tongue, relay 18 opens the "start" circuit (conductor 512), and by its outer left hand tongue applies ground to a circuit through the outer right hand tongue of relay 32 to the locking coil of relay 33 and also through a tongue and back contact of relay 19 in parallel with a key 20, the coil of relay 22, to the left hand tongue of relay 37. Through its second left hand tongue, relay 18 extends a "step circuit" entering the intra-office circuit over conductor 38, through the inner right hand tongue and back contact of relay 22, and the right hand coil of relay 37 to battery. At the sending circuit, Figs. 8 and 9, the "step circuit" is open at this time and after operation of the numbering machine included therein, this circuit will have ground periodically applied thereto which, in a manner to be described, effects stepping of the step magnet SM of the tape transmitter 12. When these step pulses are received over conductor 38, the first one through the described circuit effects operation of relay 37 which in operating extends the above circuit through its left hand coil and left hand tongue, the coil of relay 22, to ground at the outer left hand tongue of relay 18. However, relay 22 will not operate until the ground is removed from conductor 38 as this ground shunts the circuit through relay 22 and the left hand coil of relay 37. When the ground is removed from the "step circuit" 38, relay 37 locks up and relay 22 operates and remains operated for the time being. Operation of relay 22 through its inner right hand tongue extends the above "step circuit" through the coil of relay 39 and thence by parallel paths through the coil of the step magnet SM of the tape transmitter 12 to potential. One of the said parallel paths extends through the right hand coil of relay 42 and the other through the left hand coil of relay 42, the front contact and inner left hand tongue of relay 18, the inner left hand tongue and back contact of relay 19, tape lever contacts 15 and upper contact of key 21. The coils of relay 42 are opposed so it does not operate as long as the second described path remains closed, and with relay 42 released the step pulses will effect energization of the step magnet SM and advancement of the tape 13 in the transmitter 12.

Relay 43, which operates and locks up following operation of relay 32, prevents operation of relay 19 when the outer right hand tongue of relay 22 applies ground to its associated front contact. Relays 19 and 43 are part of a tape tieup circuit which signals the attendant of a tape tieup condition.

When relay 22 operates, the five outer left hand tongues thereof extend individual circuits from the five tongues of the transmitter 12 to the connector circuit where the circuits are further extended through the five outer left hand tongues and front contacts of relay 507, the second, third, fourth, fifth and sixth wipers of rotary switch 506, and the first five conductors of cable 415 to the front contacts of the five inner left hand tongues of a relay 804 of the sending circuit, Figs. 8 and 9. At this time relay 804 will be unoperated and the step circuit from the intra-office transmitter circuit which terminates on the front contact of the outer left hand tongue thereof will therefore be open at this point.

*Sending circuit operation*

Only so much of the sending circuit has heretofore been described which includes the operation of relay 901 and the description of this circuit will now be completed. The sending circuit includes a reperforator represented by the rectangle 806 for perforating a storage tape 807 for controlling a tape transmitter 808 for sending signals to a sending line L. The sending line L may be of any type, a channel of a multiplex, a channel of a carrier, a single line, or any other communication path, and the transmitter 808 will include distributing mechanism for distributing signal impulses to the sending circuit. Also included in the sending circuit is an impulse unit 809 having a plurality of contacts closed in timed relation to one another, and a numbering machine 811 which may be of the general type disclosed in Dirkes et al. Patent No. 2,193,809, issued March 19, 1940. The reperforator 806 includes five selecting magnets 812, one for each impulse of the signaling code, and may also have a tape feed-out device indicated generally by reference numeral 813.

As relay 901 operates, the second inner tongue thereof completes a circuit for operating relay 902 while the third inner tongue completes a circuit from ground through the sixth left hand tongue and back contact of relay 804, and the coil of relay 906 to potential to effect operation of relay 906. The sixth set of contacts from the top in the continuously operating pulsing unit 809 has ground on one terminal thereof and as these contacts close, this ground is now extended through the outer tongue and front contact of normally operated relay 903, the outer left hand tongue and back contact of relay 804, the front contact and fifth tongue of relay 901 and the coil of the operating magnet 814 of the numbering machine 811 to potential. Accordingly, each closing of these contacts, which are sometimes referred to as the step contacts of the impulse unit 809, will effect energization of the operating magnet 814 of the numbering machine 811 to cause the same to transmit to the reperforator 806 a series of predetermined code groups of impulses which include a message number. The numbering machine 811 effects transmission of message numbers in consecutive order with consecutive messages and includes a set of five transmitting contacts 816, one side of which extends to a common ground through a back contact and tongue of relay 802 while the other side of the transmitting contacts are connected through the back contacts and the five inner left hand tongues of relays 804 and coils of relays 817, 818 and 819, in the manner shown, to the left hand terminals of the upper five contacts of the impulse unit 809. These five contacts close once for each cycle of operation of the impulse unit and thereby cause energization of the selecting magnets 812 corresponding to the closed contacts 816 of the numbering machine 811. Subsequently, the sixth or step pulse contacts close to energize the operating magnet 814 of the numbering machine incident to another cycle of operation thereof and such operations continue for a predetermined number of cycles.

As the numbering machine concludes its last cycle of operation and incident to the transmission of the last one of the predetermined code groups therefrom, switch contacts 821 close to complete a circuit from ground through the coil of relay 804 and the front contact and sixth tongue of relay 901 to potential, thereby effecting operation of relay 804. Relay 804 in operating locks up through its right hand tongue to ground at the back contact and inner right hand tongue of relay 803. As relay 804 operates, the inner five left hand tongues disconnect the numbering machine 811 from the impulse unit 809 and connect the first five conductors of cable 415 thereto, and by its outer left hand tongue transfers the connection from the step contacts of the impulse unit 809 heretofore extending to the numbering machine, through the first section of the connector circuit to the above described step circuit of the intra-office transmitter circuit. This step circuit now extends through the coil of a relay 823 which will operate during each step impulse.

With the circuits in the condition above described, the tongues of the tape transmitter 12 of the intra-office circuit are now connected to the reperforator 806 of the sending circuit and the transmitter is periodically supplied with step pulses to advance the tape as each character in the tape 13 is transmitted to the sending circuit. Hence the message in the tape 13 of the intra-office transmitter circuit will be reperforated in the tape 807 of the sending circuit where it will follow the perforations represented by the signals transmitted from the numbering machine 811.

*Release of intra-office transmitter circuit*

In the system disclosed herein each message has appended thereto an end-of-message signal which operates the switching equipment to automatically release or disconnect an intra-office transmitter circuit from the sending circuit to which it was associated and enable the sending circuit to be seized by other intra-office transmitting circuits having messages awaiting transmission to the particular sending circuit. The connection of a second intra-office transmitter circuit to a sending circuit is effected automatically on release of the sending circuit by a first intra-office transmitter circuit if such a connection has been registered by the operation of a transmitter initiate push button and a destination push button in the connector circuit. The circuits for effecting this automatic connection of a second intra-office transmitter circuit to a particular sending circuit are described in detail in the above-mentioned Blanton patent, and in the present system these functions are effected in substantially the same manner.

As above noted, the five signal or impulse code transmitting circuits extending from the intra-office transmitter circuit and through the connector circuit to the impulse unit 809 and reperforator 806 in the sending circuit, Figs. 8 and 9, pass through the coils of relays 817, 818 and 819. Accordingly these relays are energized and operated in various combinations in accordance with each character of the message relayed to the reperforator 806. These relays, sometimes called reading relays, are for the purpose of detecting the end-of-message signal and initiating the release of the connected intra-office transmitter circuit. In the present system the end-of-message signal consists of a double period combination or two successive character codes with only the fourth impulse thereof marking. The receipt of such a character at the sending circuit effects operation of only relay 819 and with only relay 819 operated, a circuit is completed from ground through continuity contacts 824 and 826 of relays 817 and 818, respectively, the front contact and right hand tongue of relay 819, the tongue and back contact of relay 827, and through the coil of relay 828 to potential whereby said last-mentioned relay is operated. Relays 827, 828, 803 and 829 are included in a counting circuit which is effective to count the characters of the end-of-message signal and on receipt of the double period initiate the disconnect function. These counting relays operate in an obvious and well known manner and on the receipt of the second period, relay 803 will be operated, which through its inner right hand tongue removes ground from the locking circuit of relay 804 and through its outer right hand tongue opens the locking circuit of relay 901 in the sending circuit and relay 18 in the intra-office transmitter circuit. Relays 804, 901 and 18 thereupon release and as relays 804 and 901 release, the sending circuit is restored to its normal idle condition.

Relay 18 in releasing completes a circuit from ground at the front contact and outer right hand tongue of relay 31 through the inner right hand tongue and back contact of relay 18, the outer left hand tongue and front contact of relay 32, to conductor 46 extending to the connector circuit where the said ground shunts the coil of relay 501 and causes it to release. Relay 501 in releasing restores its associated section of the connector circuit to its normal idle and unoperated condition and opens the start circuit which includes conductor 512 extending to the intra-office transmitter circuit, Figs. 2 and 3, whereupon vacuum tube 30 ceases to pass current and effect release of relay 31. Release of relays 31 and 18, through obvious and described circuits, effects release of other relays of the intra-office transmitter circuit and thereby restore the intra-office transmitter circuit to its normal idle condition.

At times the attendant may wish to disconnect an intra-office transmitter circuit from a sending circuit before or during the transmission of a message. Such a disconnect function may be accomplished by operation of a key 47 to apply a ground to conductor 46 and cause release of relay 501 in the same manner that release of relay 18 applies ground to this conductor to effect release of relay 501. Since key 47 can be operated at any time, the intra-office transmitter circuit can be disconnected from the connector circuit or a sending circuit at any time. The disconnect key 47 would be operated at such times as when faulty transmission, reception or absence of an end-of-message signal failed to initiate the automatic release of the sending circuit which would in such cases be tied up indefinitely to the intra-office transmitter circuit.

Sometimes the attendant after operating a transmitter initiate key 24 of one intra-office transmitter circuit may desire to switch a message from some other intra-office transmitter circuit ahead of the message in the tape associated with the operated transmitter initiate key. As above described, the operation of a transmitter initiate key 24, provided a connection is not being established through the connector circuit at the time of operation, effects operation of a relay such as 502, 602 or 702 in a respective section of the connector circuit. With one of the relays 502, 602, or 702 operated, another transmitter initiate key 24 can not be operated to cause operation of its associated relay since each of the circuits for these relays extend through back contacts of the others. Hence the operation of one of these relays ties up the entire connector circuit which is not released until a connection has been established or registered between the associated intra-office circuit and a sending circuit represented by an actuated one of the destination indicating push button. To effect immediate release of any operated one of the relays such as 502, 602 or 702, a key 417 called a turret clear-out key is provided. Operation of this key 417 applies ground to the circuits employed to operate the relays 502, 602 and 702 to thereby short-circuit the coil of an operated relay and cause the same to release. Thereupon another transmitter initiate key may be operated to seize control of the connector circuit.

In the description of the connector circuit of Figs. 4 to 7, inclusive, it was assumed that one of the push buttons of the first twenty-five was operated and the connection was established through rotary switch 506. Operation of any one of the push buttons numbered 26 to 50 of the push button turret, marks a corresponding point on the first level of rotary switch 516 and initiates operation of its step magnet to seek the marked point and thereafter establish connections through associated points and wipers of the other levels to a sending circuit in the same manner as described above when a connection is established through rotary switch 506. Since various wipers of rotary switch 516 extend to back contacts of relay 507, the said relay is not operated when a connection is established therethrough and neither is relay 403 operated at such times.

Figure 6:
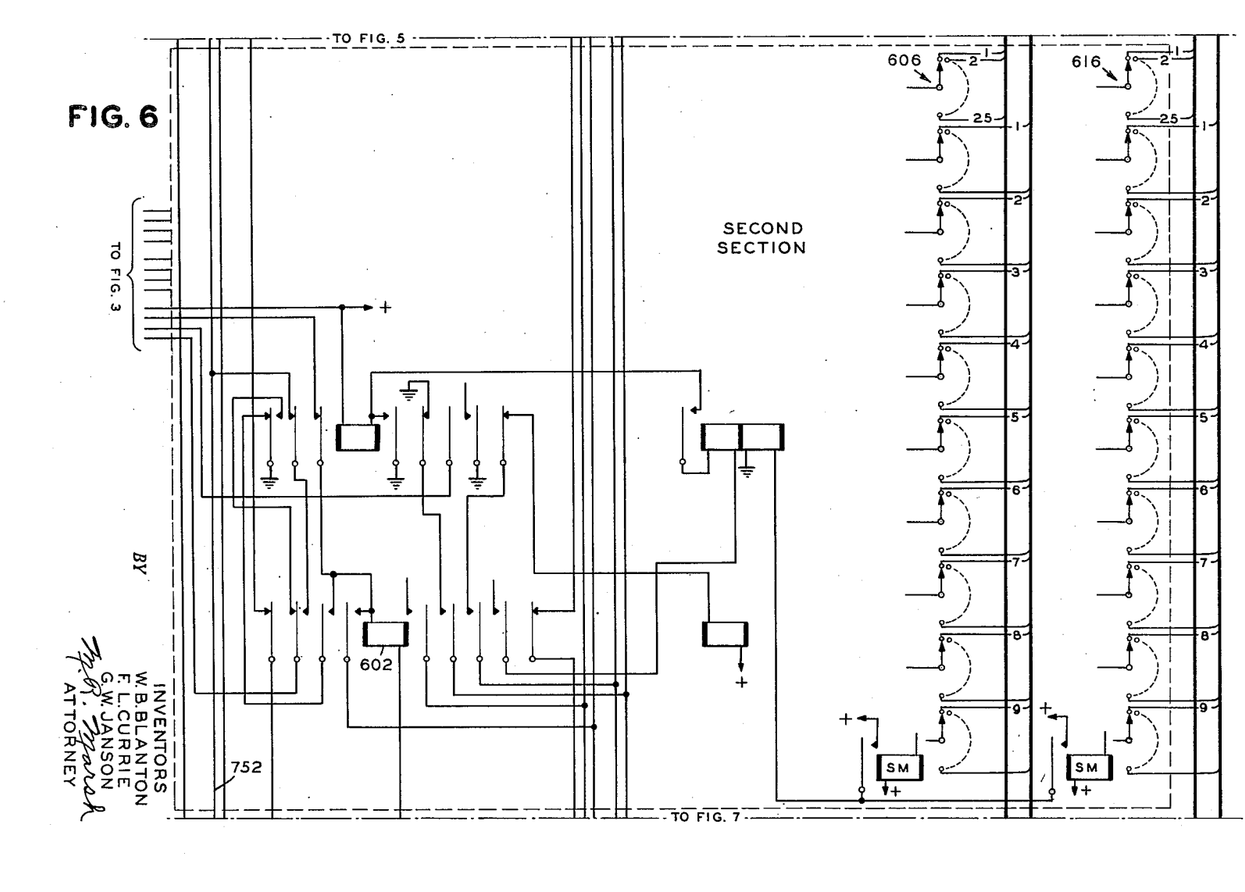
Figure 7:
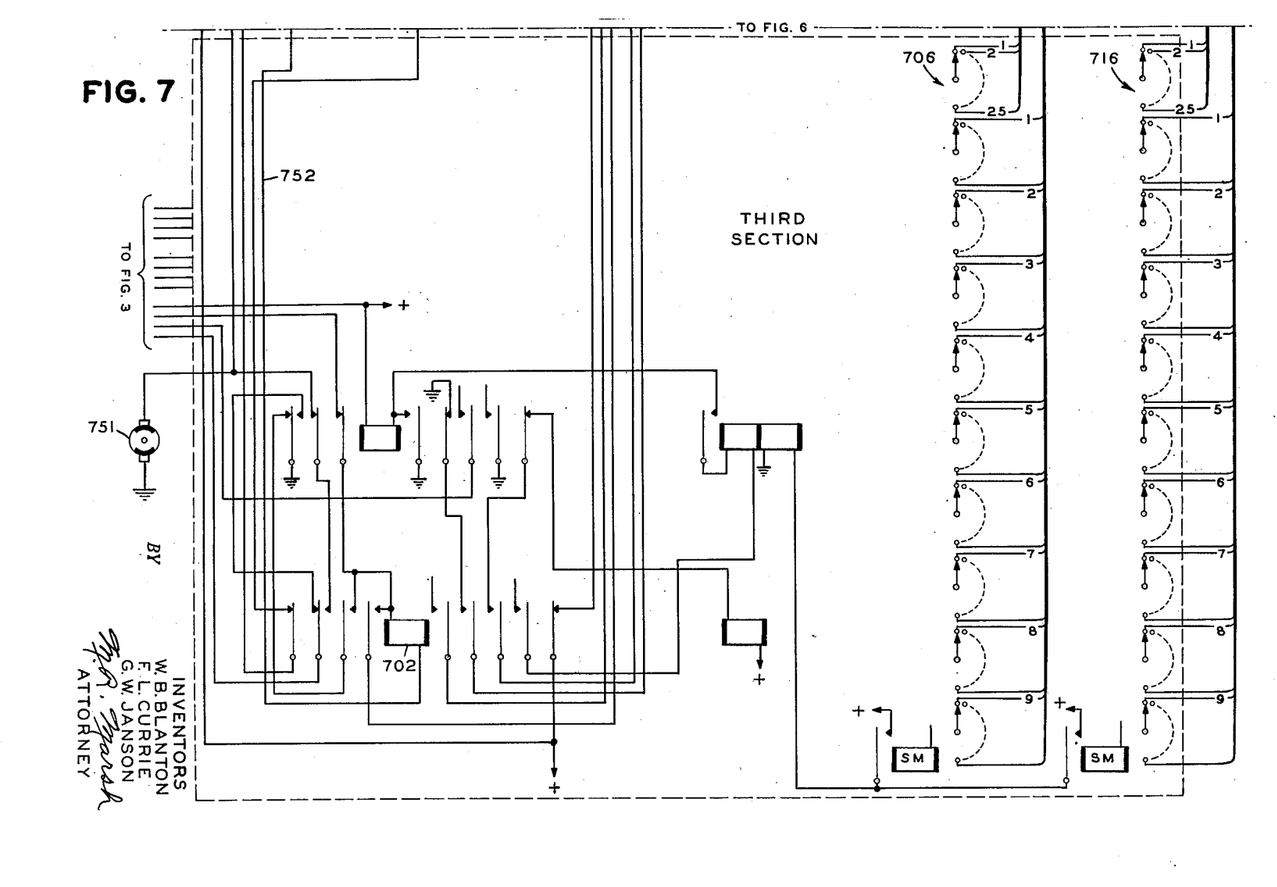

As will be noted, the various points on the various levels of switches 506 and 516 are connected in multiple to corresponding points on rotary switches 606, 616; 706 and 716 in corresponding sections of the connector circuit of Figs. 6 and 7. These sections of the connector circuit are only partially shown and it will be understood that they operate in the same manner as the section shown complete in Fig. 5. Similarly, the second and third intra-office transmitter circuits only partially shown operate in the same manner as the first intra-office transmitter circuit shown in full, Figs. 1 and 2. It will also be understood that each of the other 24 sending circuits which may be connected to cable 415 and the 25 which may be connected to cable 418 are similar to the sending circuit shown in Figs. 8 and 9 and operate in substantially the same manner.

While the invention has been described in a single illustrative embodiment thereof, it will be understood that various modifications and changes may be made therein without departing from the spirit or essential attributes thereof, and it is desired that only such limitations be placed thereon as are specifically set forth in the appended claims.

What is claimed is:

1. In a telegraph switching office having incoming and outgoing transmission paths for the receipt and transmission of permuted code groups of telegraph signals, switches individually associated with said incoming paths for extending paths therefrom to desired outgoing paths, a common control for said switches, and individually operable circuit controlling means associated with each incoming transmission path to condition said common control means to control only the switches associated with one incoming transmission path at a time.

2. A telegraph exchange system comprising a plurality of storage controlled signal transmitters, a plurality of telegraph code signal transmitting channels, a plurality of sets of rotary switches, one set for each transmitter, for establishing transmission paths from said transmitters to said transmitting channels, a single manually operable control means for controlling said switches and individual means associated with each transmitter for adapting said control means to control only its respective set of switches at a time.

3. In a telegraph exchange system, a plurality of telegraph transmitters adapted to transmit signals stored in associated tapes, a plurality of telegraph signal transmitting channels, a first group of manually operable elements one individual to each of said channels, a second group of manually operable elements one individual to each transmitter, and switching means including electromagnetic elements operative on the actuation of an element individual to a transmitter and the actuation of an element individual to a transmitting channel to establish a transmitting path between the respective transmitter and transmitting channel.

4. In a telegraph exchange, a plurality of storage controlled telegraph transmitters, a plurality of telegraph transmitting channels, switching means for establishing signal transmitting paths between said transmitters and said transmitting channels for transmitting stored signals to said channels, a manually operable element for each of said transmitters, a manually operable element for each of said transmitting channels and means including electrosensitive means controlled by the momentary operation of said manually operable elements for directively controlling said switching means.

5. In a telegraph exchange, a plurality of storage controlled telegraph transmitters, a plurality of telegraph transmitting channels, switching means for establishing signal transmitting paths between said transmitters and said transmitting channels for transmitting stored signals to said channels, a manually operable element for each one of said transmitters, a manually operable element for each one of said transmitting channels, means controlled by the operation of any one of said first mentioned elements for seizing said switching means, and means controlled thereafter by the operation of any one of said second mentioned elements for controlling said switching means to establish a transmitting path between the transmitter and transmitting channel represented by the operated ones of said elements.

6. In a telegraph exchange, a plurality of storage controlled telegraph transmitters, a plurality of telegraph transmitting channels, switching means for establishing signal transmitting paths between said transmitters and said transmitting channels for transmitting stored signals to said channels, a manually operable element for each of said transmitters, a manually operable element for each of said transmitting channels, means controlled by the operation of any one of said first mentioned elements for seizing said switching means, means controlled thereafter by the operation of any one of said second mentioned elements for controlling said switching means to establish a transmitting path between the transmitter and transmitting channel represented by the operated ones of said elements, and means operative on the establishment of such a transmitting path to release said switching means to enable the same to establish other transmitting paths.

7. In a telegraph exchange, a plurality of storage controlled telegraph transmitters, a plurality of telegraph transmitting channels, switching means for establishing signal transmitting paths between said transmitters and said transmitting channels whereby stored signals are transmitted to said channels, a manually operable element for each of said transmitters, a manually operable element for each of said transmitting channels, means controlled by the operation of any one of said first mentioned elements for seizing said switching means, means controlled thereafter by the operation of any one of said second mentioned elements for controlling said switching means to establish a transmitting path between the transmitter and transmitting channel represented by the operated ones of said elements, and means operative when the transmitting channel of the operated element is busy to register the desired transmitting path and establish the same when said channel becomes idle.

8. In a telegraph switching office, a plurality of telegraph code signal transmitters, a plurality of outgoing telegraph code signal transmitting channels, a connector for establishing telegraph signal transmitting paths between said transmitters and said transmitting channels, a first set of push-buttons, a second set of push-buttons and means including electrical circuits and electromagnetic devices controlled by said push-buttons for directively operating said connector.

9. In a telegraph switching office, a plurality of code signal telegraph transmitters, a plurality of outgoing telegraph code signal transmitting channels, a connector for establishing telegraph signal transmitting paths between said transmitters and said transmitting channels, a first set of push-buttons, a second set of push-buttons and means including electrical circuits and electromagnetic devices responsive to the operation of a push-button in each set for directively controlling said connector.

10. In a telegraph switching office, a plurality of telegraph transmitters, a plurality of outgoing telegraph transmitting channels, a connector for establishing telegraph signal transmitting paths between said transmitters and said transmitting channels, a first set of push-buttons, one individual to each of said transmitters, a second set of push-buttons, one individual to each of said transmitting channels, means controlled by the operation of a push-button of said first set for seizing said connector and preventing the seizure thereof in response to the operation of other push-buttons in said first set, and means controlled by the operation of a push-button of said second set after the seizure of said connector to establish a signal transmitting path therethrough from the transmitter to the transmitting channel represented by the operated push-buttons.

11. In a telegraph switching office, a plurality of telegraph transmitters, a plurality of outgoing telegraph transmitting channels, a connector for establishing telegraph signal transmitting paths between said transmitters and said transmitting channels, a first set of push-buttons, one individual to each of said transmitters, a second set of push-buttons, one individual to each of said transmitting channels, means controlled by the operation of a push-button of said first set for seizing said connector and preventing the seizure thereof in response to the operation of other push-buttons in said first set, means controlled by the operation of a push-button of said second set after the seizure of said connector to initiate operation of said connector to establish a signal transmitting path therethrough from the transmitter to the transmitting channel represented by the operated push-buttons, and means for releasing the connector on the establishment of the transmitting path to permit the seizure thereof in response to the operation of other push-buttons in said first set.

12. In a telegraph switching system, a plurality of storage controlled telegraph transmitters each having associated stored message signals, a plurality of outgoing telegraph signal transmitting circuits, a first group and a second group of manually operable elements, said second group having an element individual to each of said outgoing circuits, means controlled by the operation of an element in said first group to select a transmitter from which a transmitting path is to be established and means controlled by the operation of an element in said second group to select a transmitting circuit and establish a transmitting path thereto from the selected transmitter for the transmission of the associated stored signals.

13. In a telegraph switching system, a plurality of storage controlled telegraph transmitters each having associated stored message signals, a plurality of outgoing telegraph signal transmitting circuits, a first and a second group of manually operable elements, said second group having an element individual to each of outgoing circuits, means controlled by the operation of an element in said first group to select a transmitter from which a transmitting path is to be established, means controlled by the operation of an element in said second group to select the transmitting circuit and initiate the establishment of a transmitting path thereto from the selected transmitter for the transmission of the associated stored signals, and means to prevent the selection of a second transmitter until the establishment of a path from the first transmitter to the selected circuit.

14. In a telegraph switching system, a plurality of storage controlled telegraph transmitters each having associated stored message signals, a plurality of outgoing telegraph signal transmitting circuits, a first and a second group of manually operable elements, said second group having an element individual to each of said outgoing circuits, means controlled by the operation of an element in said first group to select a transmitter from which a transmitting path is to be established, means controlled by the operation of an element in said second group to select the transmitting circuit to which the transmitting path is to be established for the transmission of stored signals and initiate establishment thereof, and means to prevent the selection of more than one transmitter at a time.

15. In a telegraph switching office, a plurality of telegraph transmitters, a plurality of outgoing telegraph transmitting channels terminating at said office, a connector for establishing telegraph signal transmitting paths between said transmitters and said transmitting channels, a first set of push buttons, one individual to each of said transmitters, a visual signaling element individual to each transmitter, a second set of push buttons, one individual to each of said transmitting channels, means controlled by the operation of a push button of said first set for seizing said connector and operating the associated signaling element in a first predetermined manner, means controlled thereafter by the operation of a push button of said second set to initiate operation of said connector to establish a signal transmitting path from the transmitter to the transmitting channel represented by the operated push buttons and means operative on the establishment of the path to operate said signaling element in a second predetermined manner.

16. In a telegraph switching office, a plurality of telegraph transmitters, a plurality of outgoing telegraph transmitting channels terminating at said office, a connector for establishing telegraph signal transmitting paths between said transmitters and said transmitting channels, a first set of push buttons, one individual to each of said transmitters, a signal lamp individual to each transmitter, a second set of push buttons, one individual to each of said transmitting channels, means controlled by the operation of a push button of said first set for seizing said connector and causing the associated signal lamp to flash, means controlled thereafter by the operation of a push button of said second set to initiate operation of said connector to establish a signal transmitting path from the transmitter to the transmitting channel represented by the operated push button and means operative on the establishment of the path to cause said signal lamp to glow steadily.

17. In a telegraph switching office, a plurality of telegraph transmitters, a plurality of outgoing telegraph transmitting channels terminating at said office, a connector for establishing telegraph signal transmitting paths between said transmitters and said transmitting channels, a first set of push buttons, one individual to each of said transmitters, a second set of push buttons, one individual to each of said transmitting channels, a visual signaling element associated with said connector, means controlled by the operation of a push button of said first set for seizing said connector and operating said signaling element, means controlled thereafter by the operation of a push button of said second set to initiate operation of said connector to establish a signal transmitting path from the transmitter to the transmitting channel represented by the operated push buttons, and means to discontinue operation of said signaling element when said connector has established the desired path.

18. In a telegraph switching office, a plurality of telegraph transmitters, a plurality of outgoing telegraph transmitting channels terminating at said office, a connector for establishing telegraph signal transmitting paths between said transmitters and said transmitting channels, a first set of push buttons, one individual to each of said transmitters, a second set of push buttons, one individual to each of said transmitting channels, a signal light associated with connector means controlled by the operation of a push button of said first set for seizing said connector and lighting said signal light, means controlled thereafter by the operation of a push button of said second set to initiate operation of said connector to establish a transmitting path from the transmitter to the transmitting channel represented by the operated push buttons and means to discontinue operation of said signaling element when said connector has established the desired path.

19. In a telegraph switching office, a plurality of telegraph transmitters, a plurality of outgoing telegraph channels, a connector for establishing telegraph signal transmitting paths between said transmitters and transmitting channels, a first set of push buttons, one individual to each of said transmitters, a signal lamp individual to each of said transmitters, a second set of push buttons, one individual to each of said transmitting channels, a signal lamp associated with said second set of push buttons, means effective on the operation of a push button of said first set for seizing said connector and flashing the associated signal lamp and lighting the lamp associated with said second set of push buttons, means effective thereafter by the operation of a push button of said second set to initiate operation of said connector to establish a signal transmitting path therethrough from the transmitter to the transmitting channel represented by the operated push buttons and means operative on the establishment of the path to steadily operate the signal lamp associated with said transmitter and cease operation of the signal lamp associated with said second set of push buttons.

20. In a telegraph switching office, a plurality of telegraph transmitters, a plurality of outgoing telegraph transmitting channels, a connector for establishing telegraph signal transmitting paths between said transmitters and said transmitting channels, a first set of push buttons, one individual to each of said transmitters, a second set of push buttons, one individual to each of said transmitting channels, means controlled by the operation of a push button of said first set for seizing said connector and preventing the seizure thereof in response to the operation of other push buttons in said first set, means controlled by the operation of a push button of said second set after the seizure of said connector to initiate operation of said connector to establish a signal transmitting path therethrough from the transmitter to the transmitting channel represented by the operated push buttons, a signal light associated with said connector and means including said light to visually indicate when said connector is seized.

21. In a telegraph switching office, a plurality of telegraph transmitters, a plurality of outgoing telegraph transmitting channels, a connector including rotary switches for selectively establishing telegraph signal transmitting paths between said transmitters and said transmitting channels, a first set of manually operable control elements, one individual to each of said transmitters, a second set of manually operable control elements, one individual to each of said transmitting channels, means effective by the operation of an element of said first set for exclusively seizing said connector to prevent the seizure thereof in response to the operation of other elements of said first set and conditioning a corresponding rotary switch for operation, means effective thereafter on operation of an element of said second set to mark points on rotary switches of said connector and initiate operation of the conditioned switch to establish a signal transmitting path from the transmitter represented by the operated element of the first set to the transmitting channel represented by the operated element of the second set.

22. In a telegraph switching office, a plurality of telegraph transmitters, a plurality of outgoing telegraph transmitting channels, a connector having a section for each transmitter with each section including a plurality of rotary switches for selectively establishing telegraph signal transmitting paths between said transmitters and said transmitting channels, a first set of manually operable control elements, one individual to each of said transmitters, a second set of manually operable control elements, one element individual to each of said transmitting channels, means effective by the operation of an element of said first set for seizing the associated section of said connector and preventing the seizure of said connector in response to the operation of other elements of said first set, and means effective thereafter on operation of an element of said second set to select one of rotary switches of the seized section for operation and mark a point thereon and initiate operation of the switch to establish a signal transmitting path from the transmitter represented by the operated element of the first set to the transmitting channel represented by the operated element of the second set.

23. In a telegraph switching office, a plurality of telegraph transmitters, a plurality of outgoing telegraph transmitting channels, a connector having a section for each transmitter with each section including a plurality of rotary switches for selectively establishing telegraph signal transmitting paths between said transmitters and said transmitting channels, a first set of manually operable control elements, one individual to each of said transmitters, a second set of manually operable control elements, one individual to each of said transmitting channels, means effective by the operation of an element of said first set for seizing the associated section of said connector and preventing the seizure of said connectors in response to the operation of other elements of said first set, means effective thereafter on operation of an element of said second set to select one of the rotary switches of the seized section for operation and mark a point thereon and initiate operation of the switch to establish a signal transmitting path from the transmitter represened by the operated element of the first set to the transmitting channel represented by the operated element of the second set, and means effective on the establishment of said transmitting path to permit seizure of other sections of said connector in response to the operation of other elements of said first group.

24. In a telegraph exchange, a plurality of storage controlled telegraph transmitters, a plurality of telegraph transmitting channels, switching means for establishing signal transmitting paths between said transmitters and said transmitting channels for transmitting stored signals to said channels, a manually operable element for each one of said transmitters, a manually operable element for each one of said transmitting channels, means controlled by the operation of any one of said first mentioned elements for seizing said switching means, means controlled thereafter by the operation of any one of said second mentioned elements for controlling said switching means to establish a transmitting path between the transmitter and transmitting channel represented by the operated ones of said elements, and means operative to release the seized switching means before the operation of a second one of said elements to enable the same to be seized by the operation of another one of said first mentioned elements.

25. In a telegraph exchange, a plurality of storage controlled telegraph transmitters, a plurality of telegraph transmitting channels, switching means for establishing signal transmitting paths between said transmitters and said transmitting channels for transmitting stored signals to said channels, a manually operable element for each one of said transmitters, a manually operable element for each one of said transmitting channels, means controlled by the operation of any one of said first mentioned elements for seizing said switching means, means controlled thereafter by the operation of any one of said second mentioned elements for controlling said switching means to establish a transmitting path between the transmitter and transmitting channel represented by the operated ones of said elements, a manually operable release key, and means controlled by the operation of said key after seizure of said switching means in response to the operation of a manually operable element of a transmitter to release the said switching means.

26. In a telegraph exchange, a plurality of storage controlled telegraph transmitters, a plurality of telegraph transmitting channels, switching means for establishing signal transmitting paths between said transmitters and said transmitting channels for transmitting stored message groups of signals to said channels, said groups including end-of-message signals, a manually operable element for each one of said transmitters, a manually operable element for each one of said transmitting channels, means controlled by the operation of any one of said first mentioned elements for seizing said switching means, means controlled thereafter by the operation of any one of said second mentioned elements for controlling said switching means to establish a transmitting path between the transmitter and transmitting channel represented by the operated ones of said elements, and means responsive to the transmission of the end-of-message signal over the established path between the transmitter and transmitting channel to disestablish the same.

27. In a telegraph exchange, a plurality of storage controlled telegraph transmitters, a plurality of telegraph transmitting channels, switching means for establishing signal transmitting paths between said transmitters and said transmitting channels for transmitting stored message groups of signals to said channels, said groups including end-of-message signals, a manually operable element for each one of said transmitters, a manually operable element for each one of said transmitting channels, means controlled by the operation of any one of said first mentioned elements for seizing said switching means, means controlled thereafter by the operation of any one of said second mentioned elements for controlling said switching means to establish a transmitting path between the transmitter and transmitting channel represented by the operated ones of said elements, means responsive to the transmission of the end-of-message signal over the established path between the transmitter and transmitting channel to disestablish the same, and manually operable means for disestablishing an established transmitting path.

28. In a telegraph exchange, a plurality of storage controlled telegraph transmitters, a plurality of telegraph transmitting channels, switching means for establishing signal transmitting paths between said transmitters and said transmitting channels for transmitting stored signals to said channels, a manually operable element for each of said transmitters, a manually operable element for each of said transmitting channels and means including momentary operation of selected ones of said manually operable elements and electroresponsive means controlled thereby for directively controlling said switching means to establish, one at a time, a plurality of individual transmitting paths from said transmitters to various transmitting channels.

29. In a telegraph exchange, a plurality of storage controlled telegraph transmitters, a plurality of telegraph transmitting channels, a common switching means for establishing signal transmitting paths between said transmitters and said transmitting channels for transmitting stored signals to said channels, manually operable means for associating said transmitter, one at a time, with said switching means, other manually operable means common to said switching means and having an element individual to each transmitting channel to selectively control the same to establish a transmitting path between a transmitter associated therewith and a desired transmitting channel.

30. In a telegraph exchange, a plurality of storage controlled telegraph transmitters, a plurality of telegraph transmitting channels, switching means for establishing signal transmitting paths between said transmitters and said transmitting channels for transmitting stored signals to said channels, manually operable means for associating said transmitters, one at a time, with said switching means, other manually operable means common to said switching means and having an element individual to each transmitting channel to selectively control the same to establish a transmitting path between a transmitter associated therewith and a desired transmitting channel, and electrical control means to prevent the association of a second transmitter with said switching means until the establishment of a transmitting path from the first transmitter associated therewith.

WILLIAM B. BLANTON.
FRANK L. CURRIE.
GEORGE W. JANSON.

REFERENCES CITED

The following references are of record in the file of this patent:

UNITED STATES PATENTS

| Number | Name | Date |
| --- | --- | --- |
| 2,037,472 | Kleinschmidt | Apr. 14, 1936 |
| 2,193,810 | Wheller | Mar. 19, 1940 |
| 2,193,811 | Blanchard | Mar. 19, 1940 |
| 2,279,295 | Blanton | Apr. 14, 1942 |
| 2,345,316 | Bailey | Mar. 28, 1944 |
| 2,410,540 | Wight et al. | Nov. 4, 1946 |